United States Patent
Lee et al.

(10) Patent No.: US 10,249,885 B2
(45) Date of Patent: Apr. 2, 2019

(54) CATHODE CURRENT COLLECTOR FOR SOLID OXIDE FUEL CELL, AND SOLID OXIDE FUEL CELL COMPRISING SAME

(71) Applicants: RESEARCH INSTITUTE OF INDUSTRIAL SCIENCE & TECHNOLOGY, Pohang-si (KR); ALANTUM CORPORATION, Gyeonggi-do (KR)

(72) Inventors: In-Sung Lee, Seoul (KR); Man-Ho Park, Seoul (KR); Jae-Ho Jun, Pohang-si (KR); Chi-Rok Park, Pohang-si (KR); Bum-Soo Kim, Seoul (KR); Chang-Woo Lee, Guri-si (KR); Sung-Hwan Choi, Pohang-si (KR)

(73) Assignees: RESEARCH INSTITUTE OF INDUSTRIAL SCIENCE & TECHNOLOGY, Gyeongsangbuk-Do (KR); ALANTUM CORPORATION, Gyeonggi-Do (KR)

( * ) Notice: Subject to any disclaimer, the term of this patent is extended or adjusted under 35 U.S.C. 154(b) by 79 days.

(21) Appl. No.: 15/107,262

(22) PCT Filed: Dec. 24, 2014

(86) PCT No.: PCT/KR2014/012812
§ 371 (c)(1),
(2) Date: Jun. 22, 2016

(87) PCT Pub. No.: WO2015/099449
PCT Pub. Date: Jul. 2, 2015

(65) Prior Publication Data
US 2017/0005345 A1    Jan. 5, 2017

(30) Foreign Application Priority Data
Dec. 26, 2013  (KR) .......................... 10-2013-0164503

(51) Int. Cl.
*C25D 1/08* (2006.01)
*C25D 3/12* (2006.01)
(Continued)

(52) U.S. Cl.
CPC ............ *H01M 8/0232* (2013.01); *C25D 1/08* (2013.01); *C25D 3/12* (2013.01); *C25D 3/562* (2013.01);
(Continued)

(58) Field of Classification Search
CPC ........... C22C 9/05; C22C 9/06; C22C 19/002; C22C 19/005; C22C 19/03; C22C 22/00;
(Continued)

(56) References Cited

U.S. PATENT DOCUMENTS 3,884,658 A * 5/1975 Roach .................... B01D 45/12
123/559.1
7,273,673 B2   9/2007 Akikusa et al.
(Continued)

FOREIGN PATENT DOCUMENTS

CN    103403938 A    11/2013
EP    1 353 391 A1   10/2003
(Continued)

OTHER PUBLICATIONS

Jiang et al.; "Influence of solidification on pore structure of directionally solidified porous CuMn alloy"; Trans. Nonferrous Met. Soc. China 21 (2011), pp. 88-95. (Year: 2011).*
(Continued)

*Primary Examiner* — Gregg Cantelmo
(74) *Attorney, Agent, or Firm* — Renner, Otto, Boisselle & Sklar LLP

(57) ABSTRACT

The present invention relates to a cathode current collector for a solid oxide fuel cell and, more particularly, to a cathode current collector inserted between a cell and a metal sepa-
(Continued)

rator constituting a unit of a fuel cell stack, and a solid oxide fuel cell comprising the same.

9 Claims, 5 Drawing Sheets

(51) Int. Cl.
    *C25D 3/56* (2006.01)
    *C25D 5/50* (2006.01)
    *C25D 5/56* (2006.01)
    *H01M 4/86* (2006.01)
    *H01M 8/124* (2016.01)
    *H01M 8/0232* (2016.01)
    *H01M 8/0236* (2016.01)

(52) U.S. Cl.
    CPC ............... *C25D 5/50* (2013.01); *C25D 5/56* (2013.01); *H01M 4/8621* (2013.01); *H01M 8/0236* (2013.01); *H01M 2004/8689* (2013.01); *H01M 2008/1293* (2013.01)

(58) Field of Classification Search
    CPC .......... B32B 2305/026; H01M 8/0232; H01M 4/8621; H01M 8/0236; H01M 2004/8689; H01M 2008/1293; C25D 1/08; C25D 3/12; C25D 3/562; C25D 5/50; C25D 5/56
    See application file for complete search history.

(56) References Cited

U.S. PATENT DOCUMENTS

| | | | |
|---|---|---|---|
| 8,445,161 | B2 | 5/2013 | Wende |
| 8,902,566 | B2 | 12/2014 | Ota et al. |
| 2003/0017380 | A1 | 1/2003 | Cooper et al. |
| 2005/0217767 | A1* | 10/2005 | Barvosa-Carter ....... B60R 21/04 148/563 |
| 2010/0167169 | A1 | 7/2010 | Day et al. |
| 2013/0101922 | A1 | 4/2013 | Min et al. |
| 2013/0266862 | A1 | 10/2013 | Okuno et al. |
| 2014/0023957 | A1 | 1/2014 | Brandner et al. |

FOREIGN PATENT DOCUMENTS

| | | |
|---|---|---|
| JP | 2001-171006 A | 6/2001 |
| JP | 2001-328172 A | 11/2001 |
| JP | 2002-329508 A | 11/2002 |
| JP | 4811622 B2 | 11/2002 |
| JP | 2005-222835 A | 8/2005 |
| JP | 2011-014461 A | 1/2011 |
| JP | 2012-511243 A | 5/2012 |
| JP | 2012-132083 A | 7/2012 |
| JP | 2013-054975 A | 3/2013 |
| JP | 2015-097149 A | 5/2015 |
| KR | 10-2004-0002847 A | 1/2004 |
| KR | 10-0797048 B1 | 1/2008 |
| KR | 10-2010-0120432 A | 11/2010 |
| KR | 10-1161991 B1 | 7/2012 |
| KR | 10-1220739 B1 | 7/2012 |
| KR | 10-2013-0042868 A | 4/2013 |
| WO | 2011/152304 A | 12/2011 |

OTHER PUBLICATIONS

International Search Report and Written Opinion for corresponding Korean Patent Application No. PCT/KR2014/012812 dated Apr. 2, 2015.
S. Inazawa et al.; "Novel Plating Technology for Metallic Foam", SEI Technical Review, Jul. 2010, vol. 177, pp. 14-22.
European Search Report for corresponding European Patent Application No. 14874072.3 dated Oct. 28, 2016.

* cited by examiner

[FIG.1]
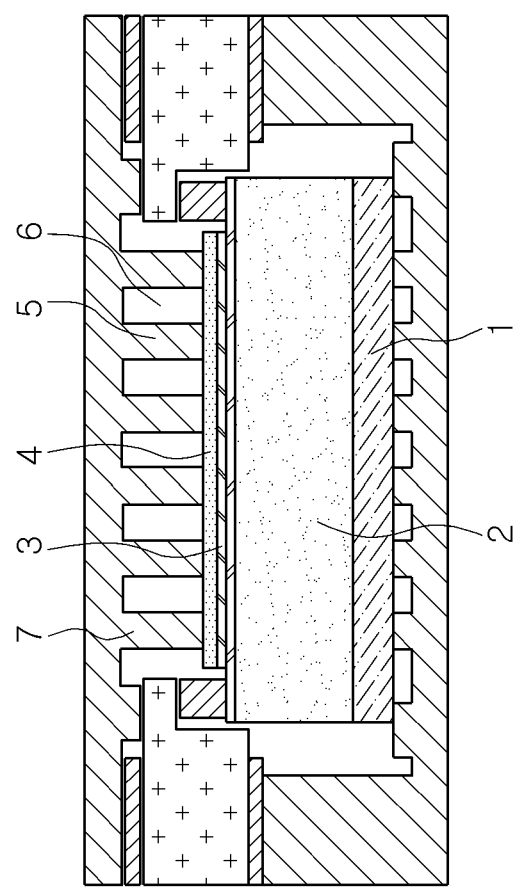

[FIG.2]
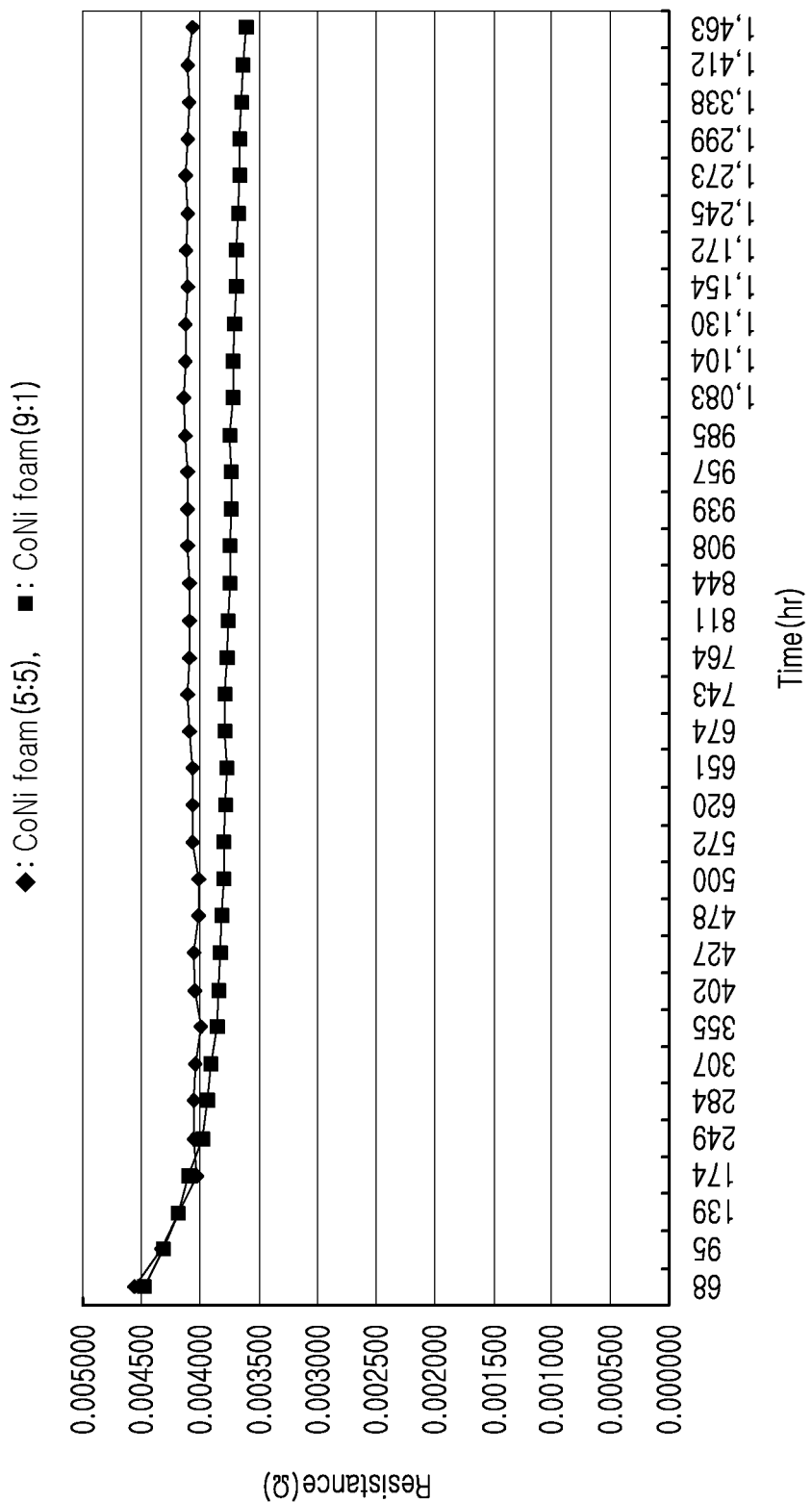

[FIG.3]
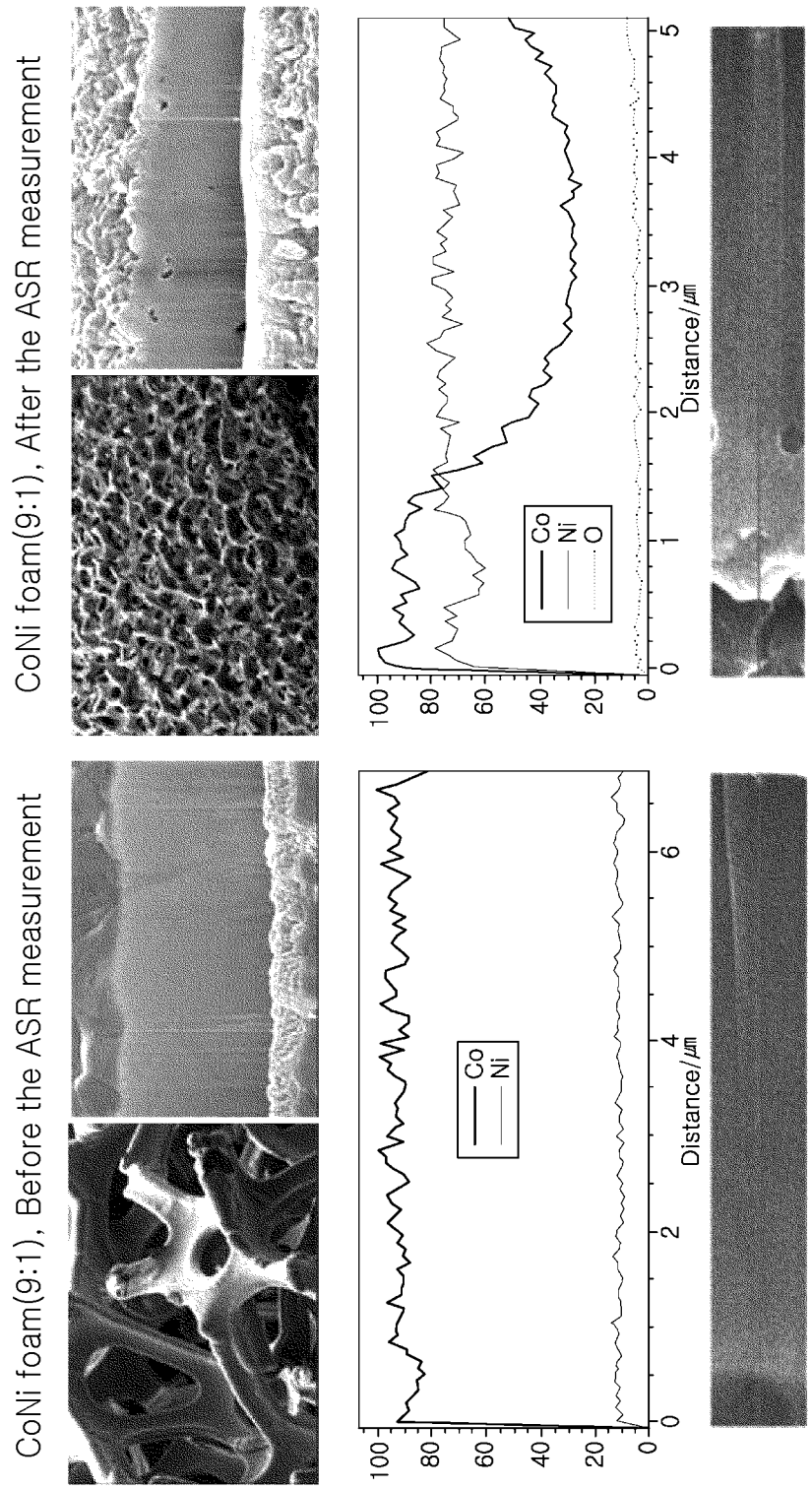

【FIG.4】
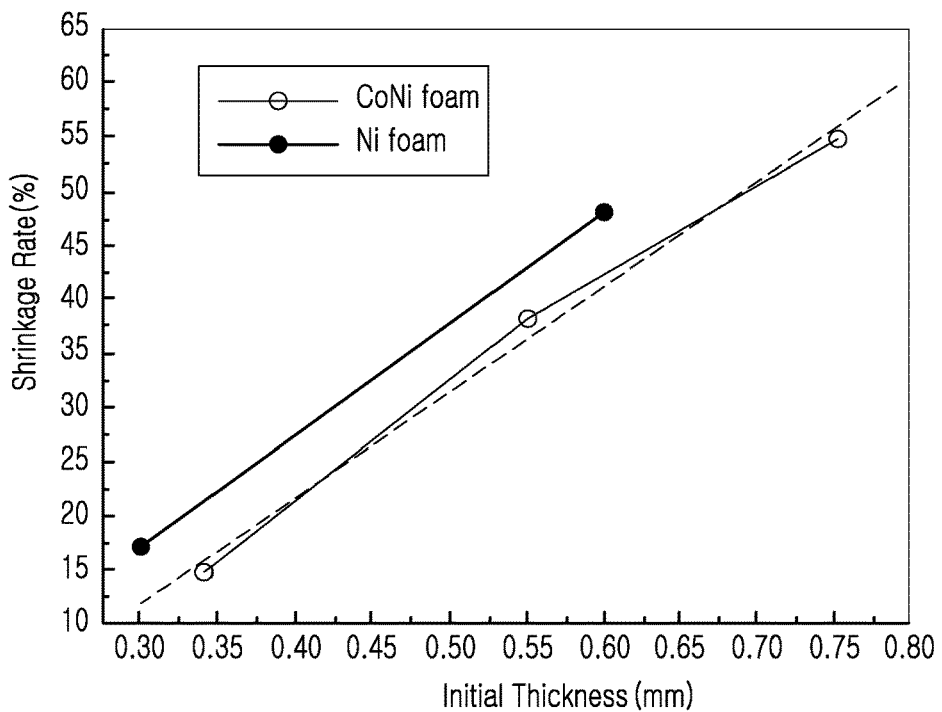
【FIG.5】
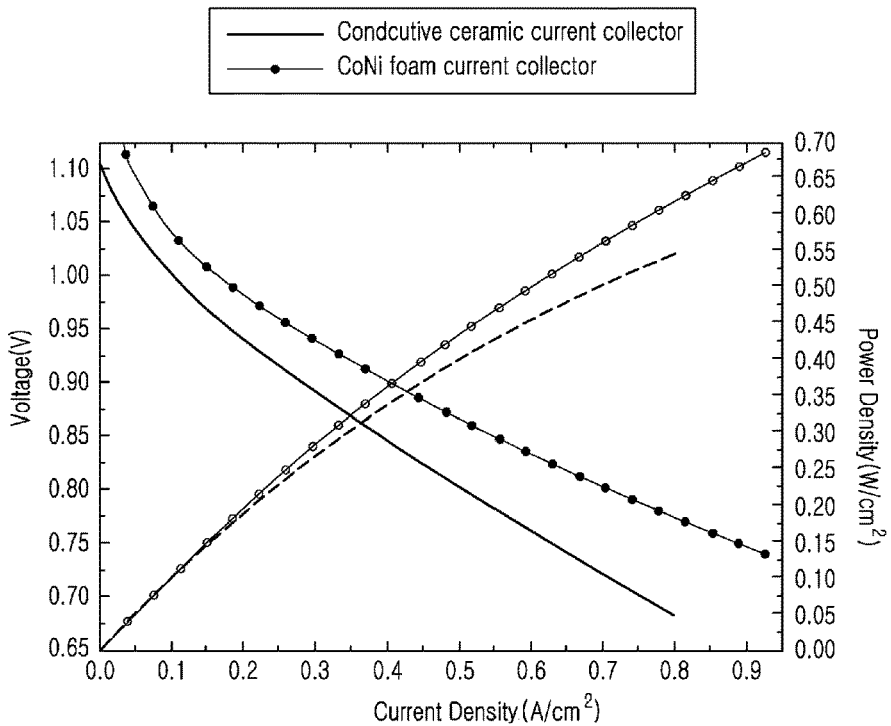

CATHODE CURRENT COLLECTOR FOR SOLID OXIDE FUEL CELL, AND SOLID OXIDE FUEL CELL COMPRISING SAME

TECHNICAL FIELD

The present invention relates to a cathode current collector for a solid oxide fuel cell and, more particularly, to a cathode current collector inserted between a cell and a metal separator constituting a unit of a fuel cell stack, and a solid oxide fuel cell including the same.

BACKGROUND ART

A fuel cell is a power system having a cell constituted of a porous anode, a cathode and a dense-structured electrolyte as a base, ultimately producing water while ions migrate through the electrolyte when hydrogen is injected into the anode and air is injected into the cathode. Herein, electrons flow to the outside through a separator, and such a combination of the separator and the cell is referred to as a unit cell, while a plurality of such unit cells connected in series is referred to as a fuel cell stack.

More specifically, the unit cell is constituted of a separator, a cell and a current collector, and among these, the cell has a difference in constitution, depending on the fuel cell types such as PEMFC, MCFC and SOFC.

As an example, a solid oxide fuel cell (SOFC) has a cell structure formed of an anode, a cathode and an electrolyte. Herein, the anode, the cathode and the electrolyte are all formed of ceramic materials, and since these are laminated and then sintered at high temperature to be prepared as a cell of one sheet, the cell surface may not be flat and may have a certain level of surface roughness.

In a cell structure formed to have an anode, a cathode and an electrolyte as described above, a separator is used to electrically connect unit cells as well as to separate hydrogen and air used as fuel and to form a gas flow channel. Such a separator may be formed to be attached to an anode or a cathode through mechanical processing, etching, stamping or the like.

However, in forming the separator as above, a height difference may inevitably occur between the separator channels, since the anode or the cathode may not be flat.

Meanwhile, by further providing a current collector between the anode and the separator, and between the cathode and separator, the electrode and the separator may be in more electrically uniform contact with each other.

In a SOFC as an example, an Ni foam having a single composition is used as an anode current collector, and since the Ni foam still maintains metallicity in a reducing atmosphere under which hydrogen, a fuel, flows, no problems are caused in current collection. However, when a metal mesh or a metal foam is used as a cathode current collector, there may be a problem in that, with a cathode having an operating temperature of approximately 700° C. to 800° C. and having air flowing therethrough, metal materials of the cathode current collector may be quickly oxidized, losing current collecting efficiency.

In order to prevent such a problem, conductive ceramic pastes are normally used to form a cathode current collector. However, there are limitations to controlling the thickness of conductive ceramics when prepared through a process such as screen printing or powder spraying, which leads to limitations in securing current collecting areas while sufficiently reducing a height difference of a separator and reducing surface roughness of a cell.

As technologies disclosed in the related art, Patent Document 1 uses a metal oxide foam as a cathode current collector; however, this is a foam entirely formed in an oxide state from an initial installation stage, and therefore, has almost no capability to reduce a height difference of a separator or to reduce surface roughness of a cell, and in terms of a preparation method, preparing the collector to have a uniform thickness is difficult, since a method of coating a metal oxide slurry on a polymer is used. There is also a limit in that the composition is limited to only a perovskite structure.

(Patent Document 1) Korean Patent No. 10-0797048

DISCLOSURE

Technical Problem

An aspect of the present invention provides a cathode current collector capable of improving current collecting efficiency and a solid oxide fuel cell including the same.

Technical Solution

According to an aspect of the present invention, there is provided a cathode current collector for a solid oxide fuel cell, wherein the cathode current collector is a porous metal foam having pores, wherein the metal foam is formed with one, two or more types of binary alloys consisting of CoNi, CoMn and CuMn, or one or two types of ternary alloys consisting of CoNiMn and CoCuMn.

According to another aspect of the present invention, there is provided a method for manufacturing a cathode current collector for a solid oxide fuel cell that includes a cathode, an anode, an electrolyte and a separator, the method including preparing a polymer foam; depositing a metal on a surface of the polymer foam; coating a metal mixture of two or more types of metal among Co, Cu, Ni and Mn on a top of the deposited metal; reduction heat treating the result after the coating; and preparing a metal foam by removing the polymer foam after the reduction heat treatment, wherein the metal foam is one or more types of CoNi, CoMn, CuMn, CoNiMn and CoCuMn.

According to another aspect of the present invention, there is provided a solid oxide fuel cell including the cathode current collector.

Advantageous Effects

According to an aspect of the present invention, a fuel cell stack exhibiting a superior fuel cell performance and degradation rate as compared to examples using existing conductive ceramic pastes as a cathode current collector can be provided.

DESCRIPTION OF DRAWINGS

FIG. 1 is a schematic diagram of a cathode current collector provided in the present invention and a solid oxide fuel cell including the same.

FIG. 2 illustrates results of ASR measurements on a metal foam prepared according to an embodiment of the present invention for 1500 hours at 800° C.

FIG. 3 illustrates results of observing micro-structures of a metal foam having a Co:Ni ratio of 9:1 according to an embodiment of the present invention before and after ASR measurements.

FIG. 4 illustrates results of measuring a shrinkage rate of a metal foam having a Co:Ni ratio of 9:1 according to an embodiment of the present invention and a Ni foam used as an anode support.

FIGS. 5 and 6 show power output evaluation and long-term degradation rate evaluation results on a unit cell (100 cm$^2$) of a solid oxide fuel cell stack using a metal foam (CoNi foam, 9:1) according to an embodiment of the present invention as a cathode current collector.

REFERENCE NUMERALS

Figure 6:
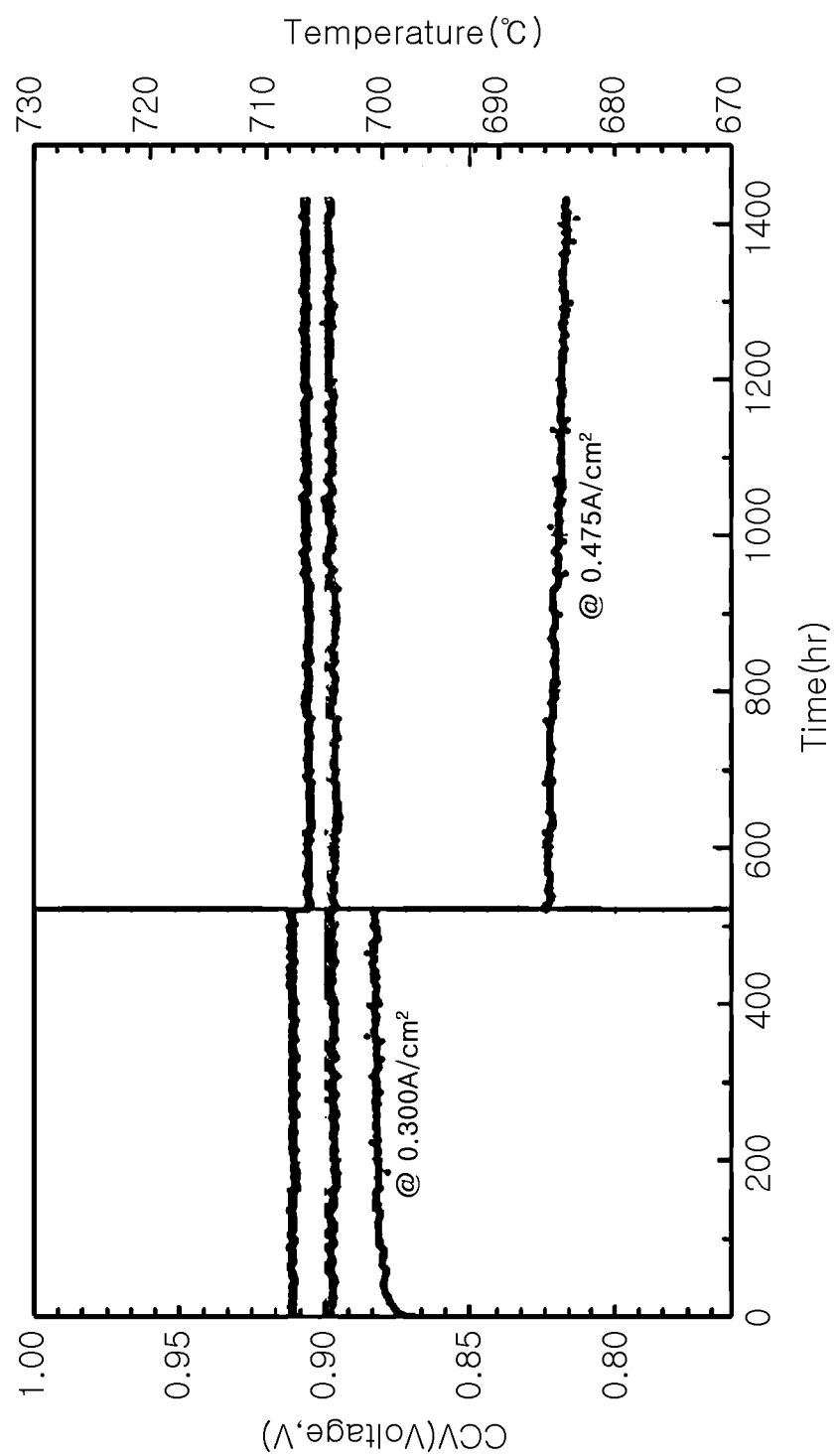

1 Anode Current Collector
2 Anode
3 Cathode
4 Cathode Current Collector
5 Separator Rib
6 Cathode Channel
7 Separator

BEST MODE

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or omitted for clarity or conciseness.

Porous metal plates, metal meshes or the like are generally used as a cathode current collector of a solid oxide fuel cell, however, solid oxide fuel cells having such a cathode current collector may have a problem in that current collecting performance may be greatly deteriorated when the fuel cells are operated at high temperatures due to rapid oxidization of metal materials of the cathode current collector.

The use of conductive ceramic pastes in cathode current collectors has recently increased; however, coating a conductive ceramic paste to a certain thickness requires a significant amount of time, causing a decline in productivity, and uniform coating of the paste is also difficult, causing a height difference with a separator formed thereon, which leads to a decline in efficiency.

In view of the above, the inventors of the present invention have, as a result of an intensive study for providing a cathode current collector for a solid oxide fuel cell not only having excellent current collecting efficiency but also capable of effectively reducing a height difference between a separator and a cathode current collector, identified that a cathode current collector exhibits excellent current collecting performance even after the operation of a solid oxide fuel cell when the cathode current collector is prepared to have 3-dimensional network structure with metal materials having excellent electrical conductivity, and have completed the present invention.

Hereinafter, the present invention will be described in detail.

A cathode current collector for a solid oxide fuel cell according to one aspect of the present invention has a shape of a porous metal foam having pores, and herein, the metal foam is preferably consisting of two or more types of metals among Co, Cu, Ni and Mn. Hereinafter, the present invention will be described in more detail with reference to the drawings.

As shown in FIG. 1, the cathode current collector according to one aspect of the present invention is formed between the cathode and a separator while covering an entire surface of the cathode.

Specifically, FIG. 1 illustrates an example of a solid oxide fuel cell according to one aspect of the present invention, and in the solid oxide fuel cell, an electrolyte and a cathode 3 are present on an anode 2 that is in contact with an anode current collector 1, and a cathode current collector 4 covering the whole cathode 3, a separator 7 formed thereon, and a cathode channel 6 formed between the separator ribs 5 are formed.

Generally, an Ni foam is normally used as an anode current collector of a solid oxide fuel cell, whereas using as a cathode current collector formed of a metal mesh or a metal foam has significant limitations. This is due to the fact that, with a cathode having an operating temperature of 700° C. or higher and having air flowing therethrough, metal materials are quickly oxidized and transformed into oxides having no conductivity, and the transformed oxides are not capable of maintaining elasticity of the initial metal foam, and is not capable of reducing a height difference between channels of a separator or reducing surface roughness of the cathode as well, and as a result, a current collecting ability is lost.

In view of the limitations of the cathode current collector described above, the inventors of the present invention used a metal foam consisting of only with materials stable at high temperatures while securing sufficient current collecting areas to form a cathode current collector.

The cathode current collector for a solid oxide fuel cell according to one aspect of the present invention is formed of a porous metal foam, and the metal foam is preferably composed of elements capable of forming conductive ceramics having a spinel structure at high temperatures.

Particularly, in the present invention, the metal foam is composed of two or more types of metals among Co, Cu, Ni and Mn, and is preferably a metal foam formed of a mixed metal of one, two or more types of binary alloys comprised of CoNi, CoMn and CuMn, or one or two types of ternary alloys comprised of CoNiMn and CoCuMn, considering electrical conductivity and elasticity of the cathode current collector.

Herein, in the present invention, excluding chromium (Cr) having a harmful influence on cell properties of a solid oxide fuel cell, and iron (Fe) components having a problem of interfacial decohesion with oxides having no conductivity is preferable. In addition, forming the metal form with a single element is not preferable in the present invention since oxides having low conductivity is preferable. In addition, forming the metal foam with a single may be difficult to use as a current collector.

More specifically, as shown in the following Table 1, it may be identified that, when the metal foam is CoMn, excellent electrical conductivity is obtained with electrical conductivity of the spinel oxide ($Mn_xCo_yO_4$) formed at a high temperature (approximately 800° C.) being a maximum of 60 S/cm. Accordingly, such a metal foam may be properly used as a cathode current collector of a solid oxide fuel cell. Moreover, metal foams of CoNiMn and CoCuMn as well as CoNi and CuMn having similar electrical conductivity with the CoMn oxide may also be properly used as an intended cathode current collector in the present invention.

According to an embodiment of the present invention, it may be identified that, when a CoNi metal foam is used as a cathode current collector, a performance degradation rate is excellent, at less than 1%, even when the current collector is used for 500 hours or longer at high temperature (refer to FIG. 6).

TABLE 1

| B-site | A-site | | | | | |
| --- | --- | --- | --- | --- | --- | --- |
| | Mg | Mn | Co | Ni | Cu | Zn |
| Al | $MgAl_2O_4$ $10^{-6}$ | $MnAl_2O_4$ $10^{-3}$ | $CoAl_2O_4$ $10^{-5}$ | $NiAl_2O_4$ $10^{-4}$ | $CuAl_2O_4$ 0.05 | $ZnAl_2O_4$ $10^{-6}$ |
| Cr | $MgCr_2O_4$ 0.02 | $Mn_xCr_yO_4$ 0.002-0.03 | $CoCr_2O_4$ 7.5 | $NiCr_2O_4$ 0.73 | $CuCr_2O_4$ 0.4 | $ZnCr_2O_4$ 0.01 |
| Mn | $MgMn_2O_4$ 0.97 | $Mn_3O_4$ 0.1 | $CoMn_2O_4$ 7 | $NiMn_2O_4$ 1.4 | $Cu_xMn_yO_4$ 1~200 12.2 (Average Value) | $ZnAl_2O_4$ $10^{-6}$ |
| Fe | $MgFe_2O_4$ 0.08 | $MnFe_2O_4$ 8 | $CoFe_2O_4$ 0.94 | $NiFe_2O_4$ 0.26 | $CuFe_2O_4$ 9.1 | $ZnFe_2O_4$ 0.07 |
| Co | — | $Mn_xCo_yO_4$ 0.01-60 9.7 (Average Value) | $Co_3O_4$ 6.7 | $NiCo_2O_4$ 10 | — | — |

(In Table 1, the unit of electrical conductivity is 'S/cm'.)

Co, Cu, Ni and Mn forming the metal foam of the present invention preferably satisfy compositions of Co:Ni, Co:Mn or Cu:Ni where Cu:Mn=1:9 to 9:1, and with this composition, conductive ceramics having excellent electrical conductivity at high temperatures may be formed.

More specifically, conductive ceramics having more superior electrical conductivity may be formed when the Co:Ni, the Co:Mn and the Cu:Mn have compositions of 1.5 to 2.0:1.5 to 1.0, 1.5 to 2.0:1.5 to 1.0 and 1.0 to 1.3:2.0 to 1.7, respectively.

The metal foam of the present invention formed of the mixed metals described above is, in addition to having excellent electrical conductivity at high temperatures, very effective in reducing a height difference between channels of a separator having a three-dimensional network structure in a room temperature state prior to operation.

However, in order to maximize such an effect, the metal foam is preferably prepared to have density of 200 g/m² or greater.

The metal foam having density of less than 200 g/m² increases porosity, but has a problem in securing sufficient electrical conductivity as a cathode current collector due to the insufficient thickness. However, the metal foam having density of greater than 1000 g/m² has a problem of an air flow not being smooth. Accordingly, density of the metal foam according to the present invention is preferably limited to 200 g/m² to 1000 g/m².

Installing the metal foam of the present invention satisfying compositions and density as above as a cathode current collector has an advantage of maximizing a contact area by enhancing height defference absorptivity as a foam shape at the initial stage, and during fuel cell operations thereafter, is still capable of inducing a smooth current flow to the cathode as a three-dimensional network structure as contact resistance decreases by forming conductive ceramics with a spinel structure having high electrical conductivity of tens to hundreds S/cm on the surface.

Hereinafter, a solid oxide fuel cell including a cathode current collector according to one aspect of the present invention will be described in detail.

More specifically, the solid oxide fuel cell includes a cathode, an anode, an electrolyte and a separator, and further includes a cathode current collector between the cathode and the separator, and herein, the cathode current collector is preferably a porous metal foam having pores.

Particularly, the metal foam in the present invention is formed of one, two or more types of binary alloys consisting of CoNi, CoMn and CuMn, or one or two types of ternary alloys consisting of CoNiMn and CoCuMn, and forms conductive ceramics having excellent electrical conductivity after high temperature oxidation, and as a result, experiences almost no performance deterioration even after the fuel cell is operated for a long period of time.

Hereinafter, a method for manufacturing a cathode current collector for a solid oxide fuel cell according to one aspect of the present invention will be described below as an embodiment.

The cathode current collector for a solid oxide fuel cell according to the present invention may be manufactured by preparing a polymer foam, depositing a metal on a surface of the polymer foam, then coating mixed metals described above thereon, reduction heat treating the result and then removing the polymer foam.

Herein, polyurethane or polyethylene foam is preferably used as the polymer foam.

The polymer foam does not have electrical conductivity and therefore, a metal is preferably deposited thereon. When a metal is deposited on a surface of the polymer foam as described above, a successive coating process may be carried out. The deposited metal is not particularly limited as long as it is a metal capable of providing electrical conductivity, and for example, one type of metal among Ni, Cu and Co may be used, and PVD may be used as the deposition method.

When the metal deposition is completed, mixed metals according to the present invention, that is, a metal mixture of two or more types of metal among Co, Cu, Ni and Mn are preferably coated.

Electroplating or powder coating may be carried out as the coating, and herein, the compositions between the metals preferably follow the compositions described above.

When using electroplating as the coating, a surface to be coated by being electroplated, that is, a polymer foam on which a metal is PVD deposited, is prepared as a negative electrode, and a metal to electrodeposit is prepared as a positive electrode. Thereafter, the negative electrode and the positive electrode were immersed in a liquid electrolyte including the mixed metal ions, and by applying electricity, target metal ions may be adhered. Herein, when the metal to be electrodeposited is Co, the liquid electrolyte preferably includes mixed metal ions of two or more types among Ni, Cu and Mn. When carrying out electroplating as above, applied voltage and current are preferably from 5 V to 10 V, and less 200 A, respectively, and a temperature and a pH of the liquid electrolyte are preferably maintained within a range of 30° C. to 35° C., and 3.5 to 5.5, respectively.

In addition, when using powder coating as the coating, it is preferable that the mixed metal powder is first coated using a spray method, and then a binder is applied thereon, and the remaining powder is second coated. In the first coating, an amount corresponding to approximately 40% to 60% of the total thickness is preferably coated. Carrying out powder coating in twice as above is for obtaining a metal foam having a uniform thickness. Using such a powder coating method is advantageous when particle sizes are smaller, and more preferably, using particles having sizes in a range of 100 nm to 10 mm is more preferable.

After the coating is completed, the polymer foam is preferably removed by reduction heat treatment. Herein, the heat treatment temperature may vary depending on a foam thickness, a plating layer thickness and the like; however, a temperature range capable of removing all the polymer foam is preferable. In the present invention, carrying out heat treatment in a 500° C. to 1000° C. range is preferable as a temperature range capable of forming a dense foam structure through intrinsic diffusion of a plating layer. Herein, the heat treatment is preferably carried out under a mixed gas atmosphere comprised of hydrogen and nitrogen or hydrogen and argon for preventing oxidation of the plating layer.

Hereinafter, the present invention will be more specifically described with reference to examples. However, the following examples are for illustrative purposes only, and the scope of the present invention is not limited thereto. The scope of the present invention is determined from descriptions in the claims and contents rationally analogized therefrom.

EXAMPLE 1

Preparation of Metal Foam

1. Preparation of CoNi Foam

After depositing Ni on a surface of a polyurethane foam using a PVD method, electroplating was carried out using 5:5 (Invention Example 1) and 9:1 (Invention Example 2) of Co:Ni. After that, the urethane foam was removed by reduction heat treating the result at 500° C. to 1000° C. to prepare a CoNi foam.

2. Preparation of Ni Foam

Preparation was carried out in the same manner as in the preparation of the CoNi foam except that Ni plating was carried out as the electroplating.

EXAMPLE 2

Evaluation on Metal Foam Performance

1. Measurement on CoNi Foam Area Specific Resistance (ASR)

ASR of the CoNi foams of Invention Examples 1 and 2 prepared in Example 1 was measured for 1,500 hours at 800° C., and the results are shown in FIG. 2.

As a result of the measurements, it was identified that the resistance value of the metal foam according to the present invention was higher than 0.005 Ω, a resistance value of conductive ceramics, and the value was maintained without change for a long period of time.

This may be due to the fact that an external film of the metal foam according to the present invention is formed of conductive ceramics having a CoNi spinel structure, and the inside has a three-dimensional network structure made of metals.

In other words, when observing a micro-structure of the CoNi foam of Invention Example 2 before and after the ASR measurement, it was identified that the three-dimensional network structure inside the metal foam before the ASR measurement was stably maintained after 1,500 hours (800° C.) had passed (refer to FIG. 3).

2. Measurement on Shrinkage Rate of CoNi Foam and Ni Foam

A shrinkage rate of the Ni foam prepared for comparison with the CoNi metal foam of Invention Example 2 was measured, and the results are shown in FIG. 4. The Ni foam is normally used as an anode current collector.

As shown in FIG. 4, it was identified that the CoNi foam according to the present invention exhibited a similar shrinkage rate with the Ni foam generally used as an anode current collector. Particularly, considering that the CoNi foam of the present invention exhibited an excellent shrinkage rate at an initial thickness of 0.75 mm, the metal foam of the present invention is considered to sufficiently reduce a height difference between channels of a separator and reduce surface roughness of a cathode.

EXAMPLE 3

Evaluation on Performance of Solid Oxide Fuel Cell Using CoNi Foam as Cathode Current Collector Power output and long-term degradation rate evaluation results on a unit cell (100 cm$^2$) of a solid oxide fuel cell stack using the CoNi foam of Invention Example 2 prepared in Example 1 as a cathode current collector are shown in FIGS. 5 and 6. Herein, an operation temperature of the fuel cell was 750° C., and results of both cases using an existing conductive ceramic paste as the cathode current collector and using the CoNi foam according to the present invention as the a cathode current collector were measured, compared and analyzed.

As shown in FIG. 5, it was identified that performance of the unit cell using the CoNi foam as the cathode current collector at current density of 0.6 A/cm$^2$ was higher by approximately 11% as compared to the unit cell using the conductive ceramics.

This may be due to the fact that the CoNi foam according to the present invention was capable of sufficiently securing current collecting areas by effectively reducing a height difference between channels of a separator and surface roughness of the cathode, and as identified in FIG. 2, had more superior ASR compared to the conductive ceramics.

In addition, as shown in FIG. 6, it was identified that the solid oxide fuel cell using the CoNi foam according to the present invention did not experience performance deterioration for approximately 500 hours at current density of 0.3 A/cm$^2$, and experienced performance deterioration of approximately 0.78% for approximately 900 hours at current density of 0.475 A/cm$^2$, and this is a result more outstanding than a performance degradation rate of 1% exhibited by current top level SOFCs.

The invention claimed is:

1. A cathode current collector for a solid oxide fuel cell, wherein the cathode current collector is a porous metal foam having pores, wherein the metal foam is formed of one or more types of alloys consisting of CoMn, CuMn, CoNiMn and CoCuMn, and wherein the metal foam has a density of 200 g/m$^2$ to 1000 g/m$^2$.

2. The cathode current collector for a solid oxide fuel cell of claim 1, wherein Co, Cu and Mn forming the metal foam have compositions of Co:Mn, or Cu:Mn=1:9 to 9:1.

3. A method for manufacturing a cathode current collector for a solid oxide fuel cell that includes a cathode, an anode, an electrolyte and a separator, the method comprising:

preparing a polymer foam;

depositing a metal on a surface of the polymer foam;

coating a metal mixture of one or more types of Co and Mn; Cu and Mn; Co, Ni and Mn; and Co, Cu and Mn on a top of the deposited metal;

reduction heat treating the result after the coating; and preparing a metal foam by removing the polymer foam after the reduction heat treatment, wherein the metal foam is one or more types of CoMn, CuMn, CoNiMn and CoCuMn, and wherein the metal foam has a density of 200 g/m$^2$ to 1000 g/m$^2$.

4. The method for manufacturing a cathode current collector for a solid oxide fuel cell of claim 3, wherein the metal deposited on the surface of the polymer foam is one or more of Ni, Cu and Co.

5. The method for manufacturing a cathode current collector for a solid oxide fuel cell of claim 3, wherein the coating of mixed metals is carried out by electroplating or powder coating.

6. The method for manufacturing a cathode current collector for a solid oxide fuel cell of claim 3, wherein the reduction heat treatment is carried out at 500° C. to 1000° C.

7. The method for manufacturing a cathode current collector for a solid oxide fuel cell of claim 3, wherein the reduction heat treatment is carried out under a mixed gas atmosphere of hydrogen and nitrogen, or hydrogen and argon.

8. A solid oxide fuel cell comprising a cathode, an anode, an electrolyte and a separator, the fuel cell further comprising:

a cathode current collector between the cathode and the separator, wherein the cathode current collector is a porous metal foam having pores, and the metal foam is formed of one or more types of alloys consisting of CoMn, CuMn, CoNiMn and CoCuMn, and wherein the metal foam has a density of 200 g/m$^2$ to 1000 g/m$^2$.

9. The solid oxide fuel cell of claim 8, wherein the cathode current collector is transformed into a conductive ceramic after high temperature oxidation.

* * * * *